(12) United States Patent  (10) Patent No.: US 8,387,694 B2
Dalrymple et al.  (45) Date of Patent: Mar. 5, 2013

(54) METHODS FOR PLACEMENT OF SEALANT IN SUBTERRANEAN INTERVALS

(75) Inventors: Eldon D. Dalrymple, Duncan, OK (US); Julio E. Vasquez, Norman, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/571,530

(22) Filed: Aug. 10, 2012

(65) Prior Publication Data

US 2012/0298360 A1  Nov. 29, 2012

Related U.S. Application Data

(62) Division of application No. 12/640,558, filed on Dec. 17, 2009, now Pat. No. 8,272,440, which is a division of application No. 12/080,647, filed on Apr. 4, 2008, now abandoned.

(51) Int. Cl.
*E21B 33/13* (2006.01)

(52) U.S. Cl. ...................................... 166/292; 166/305.1

(58) Field of Classification Search .................... None
See application file for complete search history.

(56) References Cited

U.S. PATENT DOCUMENTS

| | | | |
|---|---|---|---|
| 7,552,771 B2 * | 6/2009 | Eoff et al. ...................... | 166/279 |
| 7,730,950 B2 * | 6/2010 | Nguyen et al. ................ | 166/305.1 |
| 2005/0194140 A1 * | 9/2005 | Dalrymple et al. ........... | 166/279 |
| 2007/0029087 A1 * | 2/2007 | Nguyen et al. ................ | 166/281 |

* cited by examiner

*Primary Examiner* — Angela M DiTrani
(74) *Attorney, Agent, or Firm* — Robert A. Kent; McDermott Will & Emery LLP

(57) ABSTRACT

Methods comprising identifying an interval of a subterranean formation to be treated, the interval comprising multiple portions, each portion having a different effective permeability; introducing a relative-permeability modifier into the interval; and, introducing a sealant into the interval. The relative-permeability modifier modifies the interval to have a more uniform effective permeability to water-based fluids. The relative-permeability modifier comprises a water-soluble polymer. The more uniform effective permeability of the interval allows for a more uniform treatment of the interval by the sealant than would be allowed without treatment of the interval with the relative-permeability modifier.

21 Claims, 3 Drawing Sheets

METHODS FOR PLACEMENT OF SEALANT IN SUBTERRANEAN INTERVALS

CROSS-REFERENCE TO RELATED APPLICATIONS

This application is a divisional application of U.S. patent application Ser. No. 12/640,558, filed on Dec. 17, 2009 and published as 2010-0116498, which is a divisional application of U.S. patent application Ser. No. 12/080,647, filed on Apr. 4, 2008, published as 2009-0253594, and now abandoned, each of which is incorporated herein by reference in its entirety.

BACKGROUND

The present invention relates to subterranean treatments and, more particularly, in one or more embodiments, to introducing a relative-permeability modifier into a subterranean interval ahead of, or in conjunction with, a sealant.

In subterranean treatments, it is often desired to treat an interval of a subterranean formation having sections of varying permeability. Consequently, it may be difficult to obtain a uniform distribution of the treatment fluid throughout the entire interval. For instance, the treatment fluid may preferentially enter portions of the interval with high permeability at the expense of portions of the interval with lesser permeability. In some instances, these intervals with variable permeability may be water-producing intervals. In other instance, the portion of an interval with high permeability may be an elbow or turn in a well bore, into which the treatment fluid may preferentially enter. In yet another embodiment, the portion of an interval with high permeability may be a junction of a multi-lateral well, into which the treatment fluid may preferentially enter.

In an attempt to facilitate the uniform distribution of sealants throughout an entire interval, a variety of techniques have been used to divert the sealant to less permeable portions of the interval. For example, when the goal is to seal inflow from a long interval with multiple sections of varying permeability, sealants may be placed using packers or other such devices to focus the sealant into target intervals to help insure that the sealant does not travel into only the sections with relatively high permeability. Other such techniques may have involved, among other things, the injection of particulates, foams, or blocking polymers (e.g., crosslinked aqueous gels) into the interval so as to plug off the high-permeability portions of the subterranean formation, thereby diverting subsequently injected fluids to less permeable portions of the subterranean formation. While each of these diversion techniques has been used successfully, there may be disadvantages. Plugging off the high-permeability sections may not be suitable for a producing interval, for example, because the injected solution (or material) may reduce or stop the flow of hydrocarbons in addition to the achieving a desired diversion of the treatment fluid. Therefore, to return the interval to production, expensive and/or time-consuming remedial treatments may be required to remove the injected solutions (or materials). Furthermore, techniques geared toward injecting solutions (or materials) designed to plug off high-permeability intervals of the formation may require expensive zonal isolation, which may be inaccurate, leading to inadvertent plugging of and/or damage to the hydrocarbon-bearing sections.

SUMMARY

The present invention relates to subterranean treatments and, more particularly, in one or more embodiments, to introducing a relative-permeability modifier into a subterranean interval ahead of, or in conjunction with, a sealant.

In one embodiment, the present invention provides a method of treating an interval of a subterranean formation having a permeability that varies comprising: identifying the interval to be treated; introducing a relative-permeability modifier into the interval, wherein the relative-permeability modifier modifies the interval to have a more uniform effective permeability to water-based fluids, wherein the relative-permeability modified comprises a water-soluble polymer; and introducing a sealant into the interval, wherein the more uniform effective permeability of the interval allows for a more uniform treatment of the interval by the sealant than would be allowed without treatment of the interval with the relative-permeability modifier.

In one embodiment, the present invention provides a method of treating an interval of a subterranean formation having a permeability that varies, the method comprising: identifying the interval to be treated; introducing a relative-permeability modifier into the interval, wherein the relative-permeability modifier modifies the interval to have a more uniform effective permeability to water-based fluids, wherein the relative-permeability modifier is water soluble and comprises a polymer that has been hydrophobically modified with an alkyl group with 4 carbons to 22 carbons present on an amino group in quaternized form; monitoring the pressure of the interval; adjusting the introducing of the relative permeability modifier into the interval based at least partially on the monitored pressure so that the interval retains a water permeability sufficient to allow injection of water at a rate of about ¼ barrel per minute at a differential pressure no more than 90% of a fracture gradient of the interval; and introducing an aqueous-based sealant into the interval, wherein the more uniform effective permeability of the interval allows for a more uniform treatment of the interval by the aqueous-based sealant than would be allowed without treatment of the interval with the relative-permeability modifier.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to subterranean treatments and, more particularly, in one or more embodiments, to introducing a relative-permeability modifier into a subterranean interval ahead of, or in conjunction with, a sealant.

Embodiments of the present invention relate to using a relative-permeability modifier (e.g., water-soluble hydrophobically modified polymers) as a pre-flush to treat an interval of a subterranean formation having variable permeabilities prior to injection of a sealant. As used in this disclosure, the term "relative-permeability modifier" refers to a polymer that selectively reduces the effective permeability of a subterranean formation to water-based fluids. In general, the relative-permeability modifier should be used to modify the interval to have a more uniform effective permeability than prior to the treatment. Modification of the interval to have a more uniform effective permeability should facilitate uniform treatment of the interval with the sealant. As the interval has been modified to have a more uniform effective permeability, a more uniform distribution of sealant introduced into the interval should be obtained than would otherwise be achieved without this permeability modification. Otherwise, the sealant may preferentially enter portions of the interval with high permeability at the expense of portions of the interval with lesser permeability. As desired, embodiments of the present inventions use of the relative-permeability modifiers generally may, for example, alleviate the necessity of using packers or other such mechanisms to focus the sealant into target areas.

I. Example Methods-Treatment of Formation Interval

Figure 1:
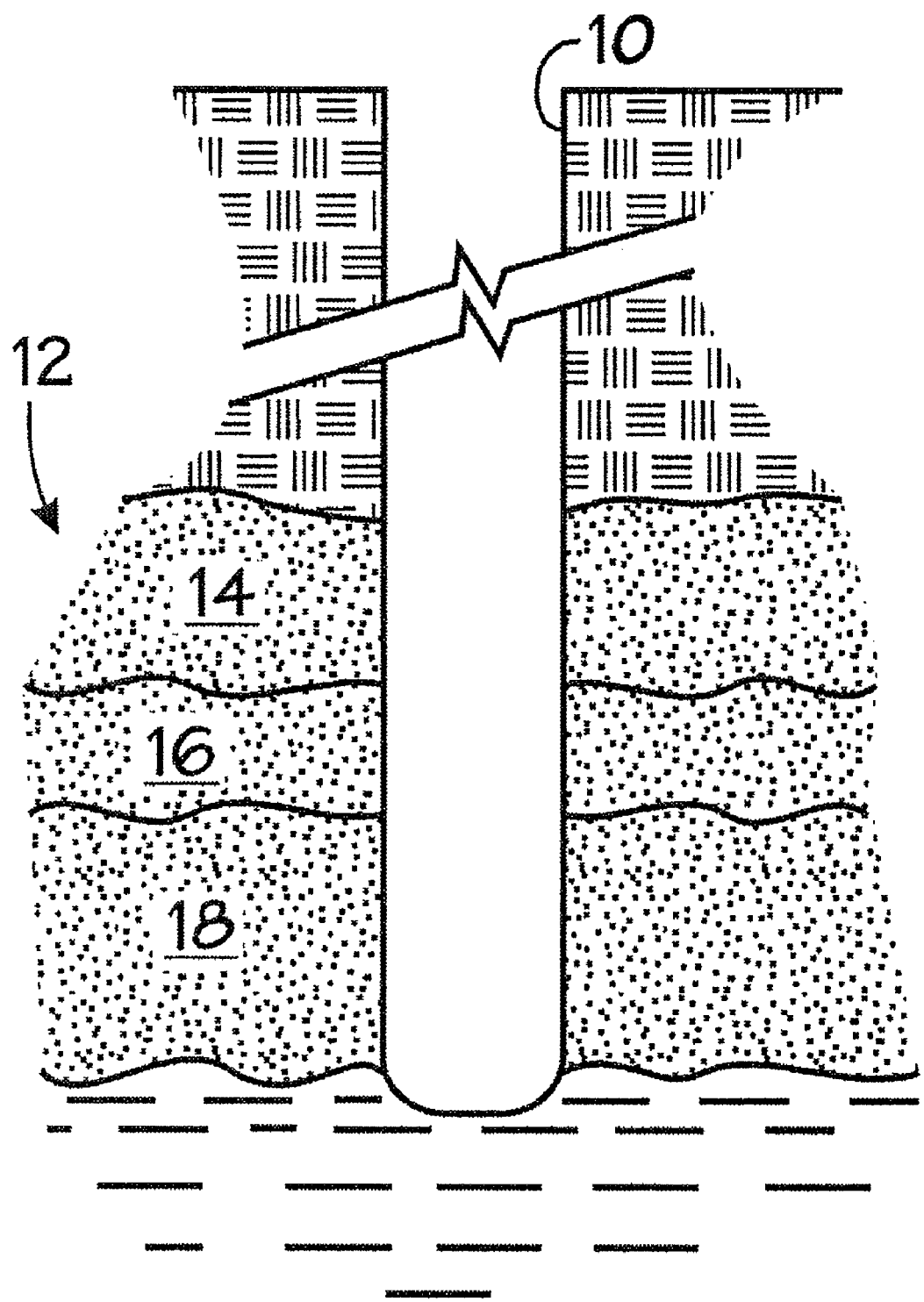
FIG. 1 is a cross-sectional, side view of a well bore penetrating an interval of a subterranean formation.

Turning to the drawings and referring first to FIG. 1, a well bore 10 is shown that penetrates an interval 12 of a subterranean formation. The interval 12 represents an interval that has been identified for treatment with a sealant in accordance with present embodiments. As will be appreciated by those of ordinary skill in the art, with the benefit of this disclosure, the interval 12 may be any interval of a subterranean formation suitable for treatment. For example, a water-producing interval of a subterranean formation may be identified for treatment with the aqueous-based sealant. By way of further example, an elbow or turn in the well bore 10 may be identified as an interval for treatment with a sealant. By way of further example, a junction of a multi-lateral well bore the interval 12 may be identified as an interval for treatment with a sealant. Even though FIG. 1 depicts the well bore 10 as a vertical well bore, the methods of certain embodiments may be suitable for use in generally horizontal, generally vertical, or otherwise formed portions of wells. Moreover, as those of ordinary skill in the art will appreciate, with the benefit of this disclosure, embodiments of the present invention may be applicable for the treatment of both production and injection wells. Additionally, while the well bore 10 is illustrated as an openhole well bore, embodiments of the present invention also may be suitable for cased well bores.

In the illustrated embodiment, the interval 12 has a permeability that varies. As those of ordinary skill in the art will appreciate, intervals of a subterranean formation often have multiple portions along the well bore of varying permeability. For example, a water-producing portion of the interval 12 may have a higher permeability than other portions of the interval 12. As will be appreciated, permeability is generally a function of formation sand particle size, porosity of the matrix, and consolidation strength of formation sand. By way of example, formations with large particle sand size, high porosity, and low consolidation strength often have higher permeability than those with small particle sand size, low porosity, and high consolidation strength. As illustrated, the interval 12 includes multiple portions along the well bore 10, including a first portion 14, a second portion 16, and a third portion 18. Each portion of the interval may have a different effective permeability. It should be noted that, while FIG. 1 illustrates the interval 12 as having three portions along the well bore 10 with different effective permeabilities, embodiments of the present invention may be applied to any interval of a subterranean formation having an effective permeability that varies one area to another.

Figure 2:
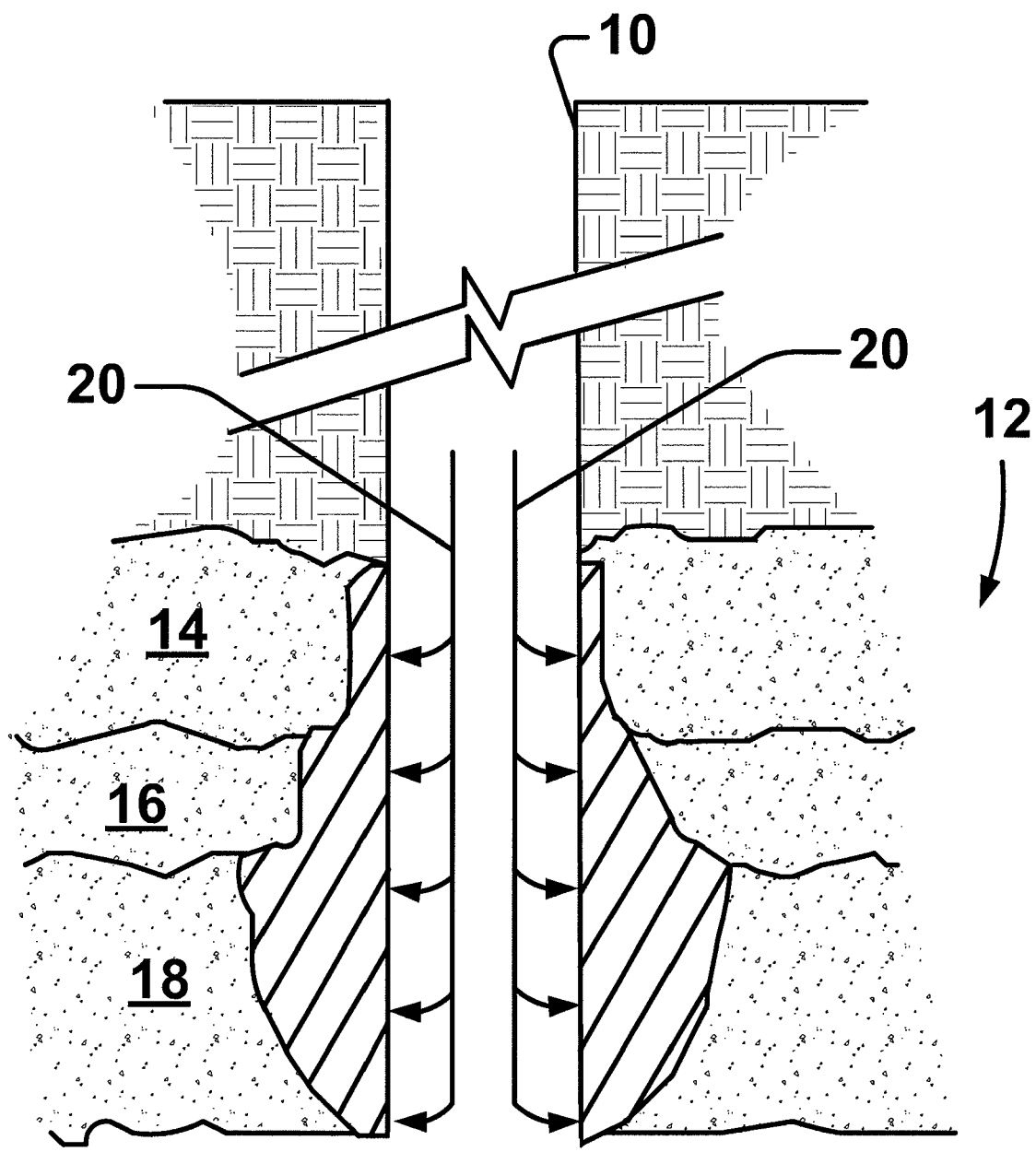
FIG. 2 is a cross-sectional, side view of a well bore penetrating an interval of a subterranean formation showing the introduction of a fluid comprising a relative-permeability modifier into the well bore of FIG. 1, in accordance with one embodiment of the present invention.

Referring now to FIG. 2, in accordance embodiments of the present invention, the interval 12 may be contacted with a relative-permeability modifier (e.g., a water-soluble hydrophobically modified polymer). In some embodiments, for contacting the interval 12 with the relative-permeability modifier, the relative-permeability modifier may be present in a permeability modifying fluid 20 introduced into the interval 12. Treatment fluids comprising the relative-permeability modifier will be referred to herein as "permeability modifying fluids." In some embodiments, the near well bore portion of the interval 12 is contacted with the relative-permeability modifier. Those of ordinary skill in the art will understand that the "near well bore portion" of a formation generally refers to the portion of a subterranean formation surrounding a well bore. For example, the "near well bore portion" may refer to the portion of the formation surrounding a well bore and having a depth of penetration of from about 1 to about 3 well bore diameters.

In general, the relative-permeability modifier should modify the permeability of the interval 12 to be more uniform. It is believed that the relative-permeability modifier should attach to surfaces of particulates within the interval 12 of the formation, thereby selectively reducing the effective permeability of the interval 12 to water without a comparable reduction of the formation's permeability to hydrocarbons. Accordingly, the effective permeability of the interval 12 of the formation to water may be modified to be generally uniform. In certain embodiments, it is believed that the effective permeability of the interval 12 to water may vary up to about 40% after treatment with the relative-permeability modifier. While the effective permeability of the interval 12 to water is selectively reduced, the interval 12 may also have some reduction in its effective permeability to hydrocarbons.

In certain embodiments, the contact of the interval 12 with the relative-permeability modifier should be controlled so that the flow of fluids (e.g., aqueous fluids) through the interval 12 is not substantially prevented after the treatment with the relative-permeability modifier. To prevent substantially reducing the flow of fluids through the interval 12 after treatment, contact of the interval 12 with the relative-permeability modifier may be halted, if the injection pressure rises to 90% of the anticipated fracture gradient, and any subsequent fluid to be injected may be "spotted" to the interval 12 before continuing injection into the interval 12. In certain embodiments, to allow for subsequent treatments with the sealant, the effective permeability of the interval to water should be at least about 1% to about 80% of its pre-treatment injectivity index (injection rate divided by injection pressure), alternatively, about 30% to about 40%. In certain embodiments, the interval 12 may retain a water permeability sufficient to allow injection of water at a rate of about ¼ barrel per minute (about 10 gallons/minute) at a differential injection pressure no more than 90% of the fracture gradient of the interval 12. Examples of a relative-permeability modifier suitable for use embodiments of the present invention are described in more detail below.

By way of example, Table 1 below illustrates a hypothetical example of an injection profile into the interval 12 both prior to, and after, treatment with the relative-permeability modifier. As will be appreciated, the injection profile indicates the distribution into the different portions of the interval 12 of an aqueous fluid bullheaded into the interval 12. As illustrated by Table 1, the injection profile into the interval 12 should be more uniform after the treatment, indicating a more uniform water permeability.

TABLE 1

|  | Injection Profile Pre-Treatment | Injection Profile Post-Treatment |
| --- | --- | --- |
| First Portion | 95 | 50 |
| Second Portion | 5 | 35 |
| Third Portion | 0 | 15 |

It should be noted that, in certain embodiments, to achieve a more uniform effective permeability to water-based fluids, the entire interval 12 along the well bore 10 need not be contacted with the relative-permeability modifier. For example, the first portion 14 and the third portion 18 may be treated to modify the permeability thereof to be about the permeability of the second portion 16.

Any suitable technique may be used for introduction of the permeability modifying fluid 20 into the interval 12, for example, bull heading, coil tubing, jointed pipe (e.g., with straddle packers, pinpoint injection tools, etc.) or any other suitable technique may be used. It should be noted that, to reduce the potential for the undesired fracturing of the interval 12, the permeability modifying fluid 20 should be introduced into the interval 12 at matrix flow rates. Example flow rates for the permeability modifying fluid 20 are in the range of from about 0.25 barrels to about 3 barrels per minute. However, those of ordinary skill in the art will appreciate that these flow rates are merely examples, and embodiments of the present invention are applicable to flow rates outside these ranges. Further, as discussed previously, contacting the interval 12 with the relative-permeability modifier should be controlled so that the effective permeability of the interval 12 is not undesirably reduced. For example, the pressure of the permeability modifying fluid 20 may be monitored as it is being introduced into the interval 12. As the effective permeability to water of the interval 12 decreases, due to the relative-permeability modifier, there should be an increase in the pressure of the permeability modifying fluid 20. Therefore, this pressure may be monitored so that the permeability of the interval 12 is not undesirably reduced to allow for the subsequent treatment of the interval 12. Other suitable techniques for monitoring the permeability of the interval 12 also may be utilized.

Optionally, an oxidizer may be introduced into the interval 12, after contacting the interval with the relative-permeability modifier, to restore the original permeability to the interval 12. In general, the oxidizer should substantially remove the relative-permeability modifier from the surfaces within the interval 12. An oxidizer may be used, for example, where the relative-permeability modifier has undesirably reduced the permeability, such as by inadvertently preventing the subsequent introduction of treatment fluids into the interval 12.

Figure 3:
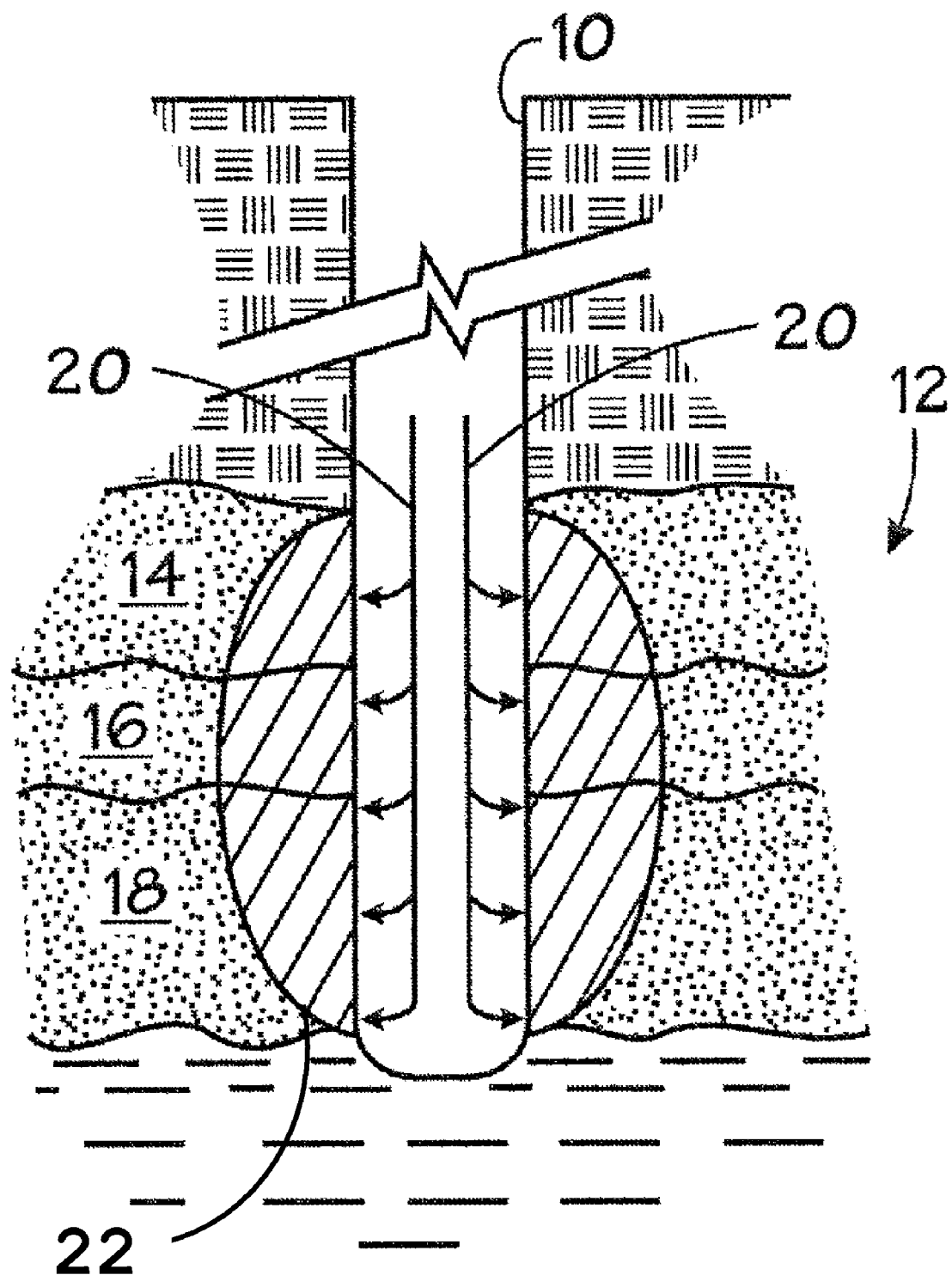
FIG. 3 is a cross-sectional, side view of a well bore penetrating an interval of a subterranean formation showing the introduction of an aqueous-based sealant into the well bore of FIG. 1, in accordance with one embodiment of the present invention.

Referring now to FIG. 3, after the interval 12 has been identified for water shut off (or water blocking) and contacted with the relative-permeability modifier, a sealant 22 (e.g., an aqueous-based sealant) may be introduced into the interval 12. As the relative-permeability modifier has modified the interval 12 to have a more uniform permeability, a more uniform distribution of the sealant 22 should be obtained than would otherwise be achieved without the permeability modification described above with reference to FIG. 2. As such, a uniform treatment of the interval 12 by the sealant 22 may be obtained, in that the sealant 22 should generally not undesirably enter portions of the interval 12 with high permeability at the expense of portions of the interval 12 with lesser permeability. Thus, the interval 12 may be contacted with the sealant 22 without requiring the use of packers, for example. Because the relative permeability modifier selectively reduces the effective permeability of the interval 12 to water, aqueous-based sealants may be used, in certain embodiments. However, as noted above, the effective permeability of the interval 12 to hydrocarbons may also be reduced and, thus, sealants that are not aqueous-based may also be used. Examples of suitable sealants will be described in more detail below.

Any suitable technique may be used for introduction of the sealant 22 into the interval 12 of the subterranean formation, for example, bull heading, coiled tubing, jointed pipe (e.g., with straddle packers, pinpoint injection tools, etc.) or any other suitable technique may be used. It should be noted that, to reduce the potential for the undesired fracturing of the interval 12, the sealant 22 should be introduced into the interval 12 at matrix flow rates. Example flow rates for the sealant 22 are in the range of from about 0.25 barrels to about 3 barrels per minute. However, those of ordinary skill in the art will appreciate that these flow rates are merely examples, and embodiments of the present invention are applicable to flow rates outside these ranges.

Additionally, the sealant 22 should achieve sufficient penetration into the interval 12 for the desired amount of sealing. In the illustrated embodiment, the sealant 22 penetrates further into the interval 12 than the permeability modifying fluid 20. This deeper penetration of the sealant 22 may be desired, for example, where the control of water production from the interval 12 is desired. However, as those of ordinary skill in the art will appreciate, the depth of penetration of the sealant 22 into the interval 12 will vary based on the particular degree of sealing desired. For example, the sealant 22 may have the same penetration, or even less penetration, than the permeability modifying fluid 20.

While specific reference is made in the above discussion to sequential treatment of the interval 12 with the relative-permeability modifier followed by treatment with the sealant 22, it should be appreciated that this invention is not limited to such sequential treatments. By way of example, embodiments of the present invention also encompass treatment of the interval 12 with a sealant 22 that comprises the relative-permeability modifier. In such a treatment, the relative-permeability modifier present in the sealant 22 should modify the permeability of the interval 12 to water-based fluids to be more uniform. Because the interval 12 is modified to have a more uniform permeability, a more uniform distribution of the sealant 22 should be obtained than would otherwise be achieved without this permeability modification. As such, a uniform treatment of the interval 12 by the sealant 22 may be obtained, in that the sealant 22 should generally not undesirably enter portions of the interval 12 with high permeability at the expense of portions of the interval 12 with lesser permeability.

II. Example Relative-Permeability Modifiers

As described above, a relative-permeability modifier may be introduced into at least a portion of a subterranean formation, in accordance with certain embodiments. In general, suitable relative-permeability modifiers may be any of a variety of compounds that are capable of selectively reducing the effective permeability of a formation to water-based fluids without a comparable reduction of the formation's effective permeability to hydrocarbons. Suitable relative-permeability modifiers generally include water-soluble polymers that attach to surfaces within the formation, reducing the water permeability without a comparable reduction in hydrocarbon permeability. As used herein, "water soluble" refers to at least about 0.01 weight percent soluble in distilled water at room temperature (about 72° F.). In certain embodiments, the water-soluble polymer is at least about 0.45 weight percent soluble in distilled water at room temperature. In certain embodiments, the water-soluble polymer is at least about 0.6 weight percent soluble in distilled water at room temperature.

Those of ordinary skill in the art, with the benefit of this disclosure, will appreciate that a variety of different water-soluble polymers may be suitable for use as the relative-permeability modifiers. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

In addition, water-soluble polymers suitable for use as relative-permeability modifiers also may include hydrophobically modified polymers. As used in this disclosure, the terms "hydrophobically modified," "hydrophobic modification," and the like refer to the incorporation into the hydrophilic polymer structure of hydrophobic groups, wherein the alkyl chain length is about 4 to about 22 carbons. While these hydrophobically modified polymers have hydrophobic groups incorporated into the hydrophilic polymer structure, they should remain water soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Example hydrophobically modified polymers may contain a hydrophilic polymer backbone and a hydrophobic branch, wherein the hydrophobic branch includes an alkyl chain of about 4 to about 22 carbons. In certain embodiments, the hydrophobic branch may have an alkyl chain length of about 7 to about 22 carbons. In certain embodiments, the hydrophobic branch may have an alkyl chain length of about 12 to about 18 carbons.

Additional examples of suitable hydrophobically modified polymers include a polymer that has been hydrophobically modified with an alkyl group present on an amino group (in the polymer backbone or as a pendant group) in quaternized form. For example, an alkyl group may be present on a dialkyl amino pendant group in quaternized form. In one embodiment, the dialkyl amino pendant group comprises a dimethyl amino pendant group. One specific example of a hydrophobically modified polymer includes a polydimethylaminoethylmethacrylate or polydimethylaminopropylmethacrylamide that has been hydrophobically modified with an alkyl group with 4 carbons to 22 carbons (e.g., 4 carbons, 6, carbons, 8 carbons, 10 carbons, 12 carbons, 14 carbons, 16 carbons, 18 carbons, 20 carbons, 22 carbons, etc.) on a dimethylamino group. An example of a suitable HM modified polymer is HPT-1™ relative permeability modifying polymer available from Halliburton Energy Services, Inc., Duncan, Okla.

Examples of suitable hydrophobically modified polymers that may be utilized include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another example of a suitable hydrophobically modified polymer comprises an amino methacrylate/alkyl amino methacrylate copolymer. An example of a suitable amino methacrylate/alkyl amino methacrylate copolymer includes a dimethlyaminoethyl methacrylate/alkyl-dimethylammoniumethyl methacrylate copolymer. An example of a suitable dimethlyaminoethyl methacrylate/alkyl-dimethylammoniumethyl methacrylate copolymer includes a dimethylaminoethyl methacrylate/hexadecyl-dimethylammoniumethyl methacrylate copolymer. As discussed in more detail below, these copolymers may be formed, in embodiments, by reactions with a variety of alkyl halides. For example, in some embodiments, the hydrophobically modified polymer may comprise a dimethylaminoethyl methacrylate/hexadecyl-dimethylammoniumethyl methacrylate bromide copolymer.

Example hydrophobically modified polymers may be synthesized utilizing any suitable technique. For example, the hydrophobically modified polymers may be a reaction product of one or more hydrophilic polymers and one or more hydrophobic compounds. By way of further example, the hydrophobically modified polymers may be prepared from a polymerization reaction comprising a hydrophilic monomer and a hydrophobically modified hydrophilic monomer. In certain embodiments, the hydrophobically modified polymers may be pre-reacted before they are placed into the well bore. Alternatively, in some embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer via reaction with a hydrophobic compound. As described above, hydrophobic modification refers to incorporation into the hydrophilic polymer structure of hydrophobic groups, wherein the alkyl chain length is from about 4 to about 22 carbons. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), poly(methacrylic acid/dimethylaminopropyl methacrylamide), and combinations thereof. In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments, the hydrophilic polymers comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one embodiment, the starch is a cationic starch. A suitable cationic starch may be formed by reacting a starch, such as corn, maize, waxy maize, potato, tapioca, or the like, with the reaction product of epichlorohydrin and trialkylamine.

The hydrophobic compounds that are capable of reacting with the hydrophilic polymers include alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

A variety of hydrophobically modified hydrophilic monomers also may be used to form the hydrophobically modified polymers useful in certain embodiments. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

In addition, water-soluble polymers suitable for use as relative-permeability modifiers also may include hydrophilically modified polymers. As used in this disclosure, the terms "hydrophilic modification," "hydrophilically modified," and the like refer to the incorporation into the hydrophilic polymer structure of hydrophilic groups, such as to introduce branching or to increase the degree of branching in the hydrophilic polymer. The hydrophilically modified polymers of certain embodiments typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. In certain embodiments, suitable hydrophilically modified polymers may be formed by additional hydrophilic modification, for example, to introduce branching or to increase the degree of branching, of a hydrophilic polymer. Those of ordinary skill in the art, with the benefit of this disclosure, will be able to determine other suitable methods for the preparation of suitable hydrophilically modified polymers.

The hydrophilic polymers suitable for forming the hydrophilically modified polymers used in certain embodiments should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

Hydrophilic compounds suitable for reaction with the hydrophilic polymers include, but are not limited to: polyethers that comprise halogens; sulfonates; sulfates; organic acids; and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Examples of suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

III. Example Permeability Modifying Fluids

In accordance with some embodiments, the relative-permeability modifier may be present in a fluid, referred to herein as a "permeability modifying fluid," introduced into the interval 12. Sufficient concentrations of the relative-permeability modifier should be present in these permeability modifying fluids to provide the desired level of permeability modification. In some embodiments, the relative-permeability modifier may be present in these permeability modifying fluids in an amount in the range of from about 0.02% to about 10% by weight of the permeability modifying fluid. In another embodiment, relative-permeability modifier may be present in these permeability modifying fluids in an amount in the range of from about 0.05% to about 1.0% by weight of the permeability modifying fluid. In certain embodiments, the relative-permeability modifier may be provided in a concentrated aqueous solution prior to its combination with the other components necessary to form the permeability modifying fluids.

In addition to the relative-permeability modifier, the permeability modifying fluids generally also comprise water. The water included in the permeability modifying fluid may include freshwater, saltwater (e.g., water containing one or more salts dissolved therein), brines (e.g., natural or produced brines), seawater, or another other aqueous fluid that does not undesirably effect the other components in the permeability modifying fluid.

IV. Example Sealants

The sealants used in certain embodiments may include any fluids suitable for sealing the interval 12 of the subterranean formation that, in the absence of the above-described permeability modification, would typically enter portions of the interval 12 with higher permeabilities at the expense of portions of the interval 12 with lesser permeabilities. For example, sealants that may be used in certain embodiments may comprise gelable compositions. In general, suitable gelable compositions should cure to form a gel that at least substantially plugs the permeability of the formation. Gelable compositions suitable for use in certain embodiments include, for example, those compositions that cure to form a semi-solid, immovable, gel-like substance. Prior to curing, the gelable compositions should have low viscosities and be capable of flowing in pipe and into the subterranean formation.

Examples of suitable gelable compositions include gelable aqueous silicate compositions, crosslinkable aqueous polymer compositions, polymerizable organic monomer compositions, and resin compositions. Other gelable compositions that cure to substantially plug the permeability of the formation may also be suitable.

1. Gelable Aqueous Silicate Compositions

In certain embodiments, the aqueous-based sealant may comprise a gelable aqueous silicate composition. Suitable gelable aqueous silicate compositions for plugging the permeability of a formation generally comprise aqueous alkali metal silicate solution and a catalyst (e.g., a temperature-activated catalyst) for gelling the aqueous alkali metal silicate solution. An example of a suitable gelable aqueous silicate compositions is INJECTROLT™ sealant, which is available from Halliburton Energy Services, Inc. Examples of suitable gelable aqueous silicate compositions are described in U.S. Pat. No. 4,466,831, the disclosure of which is incorporated herein by reference as if fully set forth herein.

The aqueous alkali metal silicate solution component of the gelable aqueous silicate compositions generally comprises water and an alkali metal silicate. The water generally may include freshwater, saltwater (e.g., water containing one or more salts dissolved therein), brines (e.g., natural or produced brines), seawater, or any other aqueous liquid that does not undesirably react with the other components used in accordance with this invention or with the subterranean formation. Examples of suitable alkali metal silicates include, but are not limited to, one or more of sodium silicate, potassium silicate, lithium silicate, rubidium silicate, or cesium silicate. While sodium silicate may be present in many forms, the sodium silicate used in the aqueous alkali metal silicate solution may have a $Na_2O$-to-$SiO_2$ weight ratio in the range of from about 1:2 to about 1:4. For example, the sodium silicate may have a $Na_2O$-to-$SiO_2$ weight ratio in the range of about 1:3.2. Generally, the alkali metal silicate may be present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired gel described above. Selection of a temperature-activated catalyst is related, at least in part, to the temperature of the subterranean formation to which the gelable aqueous silicate composition will be introduced. The temperature-activated catalysts that can be used in the gelable aqueous silicate compositions of some embodiments include, but are not limited to, ammonium sulfate (e.g., for the range of from about 60° F. to about 240° F.); sodium acid pyrophosphate (e.g., for the range of from about 60° F. to about 240° F.); citric acid (e.g., for the range of from about 60° F. to about 120° F.); and ethyl acetate (e.g., for the range of from about 60° F. to about 120° F.). Generally, the temperature-activated catalyst may be present in the gelable aqueous silicate composition in the range of from about 0.1% to about 5% by weight of the gelable aqueous silicate composition.

2. Crosslinkable Aqueous Polymer Compositions

In some embodiments, the aqueous-based sealant may comprise a crosslinkable aqueous polymer composition. Suitable crosslinkable aqueous polymer compositions for plugging the permeability of the formation generally comprise water, a crosslinkable polymer, and a crosslinking agent. Such compositions are similar to those used to form gelled treatment fluids, such as fracturing fluids, but, according to the example methods described herein, they are not exposed to breakers or de-linkers and so they retain their viscous nature over time. An example of a suitable crosslinkable polymer composition is used in H2-ZERO™ conformance control solutions, which are commercially available from Halliburton Energy Services, Inc. Examples of suitable crosslinkable aqueous polymer compositions are described in U.S. Pat. Nos. 5,836,392, 6,192,986, and 6,196,317, the disclosures of which are incorporated herein by reference as if fully set forth herein.

The water may be any suitable water in which the crosslinkable composition and the crosslinking agent may be dissolved, mixed, suspended, or dispersed therein to facilitate gel formation. For example, the water may include freshwater, saltwater (e.g., water containing one or more salts dissolved therein), brines (e.g., natural or produced brines), seawater, or any other aqueous liquid that does not undesirable react with the other components used in accordance with embodiments or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone.

The crosslinkable polymer used should be included in the crosslinkable aqueous polymer composition in an amount sufficient to form the desired gelled substance in the subterranean formation. In some embodiments, the crosslinkable polymer is included in the crosslinkable aqueous polymer composition in an amount in the range of from about 1% to about 30% by weight of the aqueous solvent. In another embodiment, the crosslinkable polymer is included in the crosslinkable aqueous polymer composition in an amount in the range of from about 1% to about 20% by weight of the aqueous solvent.

The crosslinkable aqueous polymer compositions of some embodiments further comprise a crosslinking agent for crosslinking the crosslinkable polymers to form the desired gelled substance. In some embodiments, the crosslinking agent is a molecule or complex containing a reactive transition metal cation. An example of a suitable crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of some embodiments in an amount sufficient to provide, inter alia, the desired degree of crosslinking. In some embodiments, the crosslinking agent is present in the crosslinkable aqueous polymer compositions in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

3. Polymerizable Organic Monomer Compositions

In some embodiments, the aqueous-based sealant may comprise a polymerizable organic monomer composition. Suitable polymerizable organic monomer compositions for plugging the permeability of a formation generally comprise water, a water-soluble polymerizable organic monomer, an oxygen scavenger, and a primary initiator. An example of a suitable polymerizable organic monomer compositions is used in PERM-SEAL™ sealant treatment services, which are commercially available from Halliburton Energy Services, Inc. Examples of suitable polymerizable organic monomer compositions are described in U.S. Pat. Nos. 5,358,051 and 5,335,726, the disclosures of which are incorporated herein by reference as if fully set forth herein.

The water in the polymerizable organic monomer composition generally may include freshwater, saltwater (e.g., water containing one or more salts dissolved therein), brines (e.g., natural or produced brines), seawater, or any other aqueous liquid that does not undesirable react with the other components used in accordance with embodiments or with the subterranean formation.

A variety of monomers may be suitable for use as the water-soluble polymerizable organic monomers. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethyl-methacrylate, 2-triethylammoniumethylmethacrylate chloride, N,N-dimethyl-aminopropylmethacryl-amide, methacrylamidepropyltriethylammonium chloride, N-vinyl pyrrolidone, vinyl-phosphonic acid, and methacryloyloxy-ethyl trimethylammonium sulfate, and mixtures thereof. In certain embodiments, the water-soluble polymerizable organic monomer may be self-crosslinking. Examples of suitable monomers which are self crosslinking include, but are not limited to, hydroxyethylacrylate, hydroxymethylacrylate, hydroxyethy lmethacrylate, N-hydroxymethylacryl amide, N-hydroxymethyl-methacrylamide, polyethylene glycol acrylate, polyethylene glycol methacrylate, polypropylene gylcol acrylate, polypropylene glycol methacrylate, and mixtures thereof. An example of one suitable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments, the water-soluble polymerizable organic monomer is included in the polymerizable organic monomer composition in an amount in the range of from about 1% to about 30% by weight of the water. In another embodiment, the water-soluble polymerizable organic monomer is included in the polymerizable organic monomer composition in an amount in the range of from about 1% to about 20% by weight of the water.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable organic monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of an embodiment in an amount in the range of from about 0.005% to about 0.1% by weight of the polymerizable organic monomer composition.

The primary initiator is used, inter alia, to initiate polymerization of the water-soluble polymerizable organic monomer (s) used in an embodiment. Any compound or compounds that form free radicals in aqueous solution may be used as the primary initiator. The free radicals act, inter alia, to initiate polymerization of the water-soluble polymerizable organic monomer present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Examples of suitable azo polymerization initiators include 2,2'-azobis(2-imidazole-2-hydroxyethyl)propane, 2,2'-azobis(2-aminopropane), 4,4'-azobis(4-cyanovaleric acid), and 2,2'-azobis(2-methyl-N-(2-hydroxyethyl)propionamide. Generally, the primary initiator should be present in the polymerizable organic monomer composition in an amount sufficient to initiate polymerization of the water-soluble polymerizable organic monomer(s). In certain embodiments, the primary initiator is present in the polymerizable organic monomer composition in an amount in the range of from about 0.1% to about 5% by weight of the water-soluble polymerizable organic monomer (s). One skilled in the art will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from about 0.1% to about 5% by weight of the water-soluble polymerizable organic monomer(s).

Also optionally, the polymerizable organic monomer compositions of certain embodiments further may comprise a crosslinking agent for crosslinking the polymerizable organic monomer compositions in the desired gelled substance. In some embodiments, the crosslinking agent is a molecule or complex containing a reactive transition metal cation. An example of a suitable crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

4. Resin Compositions

In some embodiments, the sealant may comprise a resin. The term "resin" as used herein refers to any of numerous physically similar polymerized synthetics or chemically modified natural resins including thermoplastic materials and thermosetting materials. Resins that may be suitable for use in the present invention may include substantially all resins known and used in the art.

One type of resin suitable for use in the methods of the present invention is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. It is within the ability of one skilled in the art, with the benefit of this disclosure, to determine if and how much solvent may be needed to achieve a viscosity suitable to the subterranean conditions. Factors that may affect this decision include geographic location of the well, the surrounding weather conditions, and the desired long-term stability of the consolidating agent. An alternate way to reduce the viscosity of the hardenable resin is to heat it. The second component is the liquid hardening agent component, which comprises a hardening agent, an optional silane coupling agent, a surfactant, an optional hydrolyzable ester for, among other things, breaking gelled fracturing fluid films on proppant particulates, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, that may be suitable for use in the methods of the present invention include those described in U.S. Pat. Nos. 6,582,819, issued to McDaniel, et al.; 4,585,064 issued to Graham, et al.; 6,677,426 issued to Noro, et al.; and 7,153,575 issued to Anderson, et al., the disclosures of which are herein incorporated by reference.

The hardenable resin may be included in the liquid hardenable resin component in an amount in the range of about 5% to about 100% by weight of the liquid hardenable resin component. It is within the ability of one skilled in the art, with the benefit of this disclosure, to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and combinations thereof. Other preferred solvents may include aqueous dissolvable solvents such as, methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not of limitation, in subterranean formations having a temperature of about 60° F. to about 250° F., amines and cyclo-aliphatic amines such as piperidine, triethylamine, tris(dimethylaminomethyl)phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the resin composition may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to formation particulates or proppant particulates. Examples of suitable silane coupling agents include, but are not limited to, N-2-(aminoyl)-3-aminopropyltrimethoxysilane, and 3-glycidoxypropyltrimethoxysilane, and combinations thereof. The silane coupling agent may be included in the resin component or the liquid hardening agent component (according to the chemistry of the particular group as determined by one skilled in the art with the benefit of this disclosure). In some embodiments of the present invention, the silane coupling agent used is included in the liquid hardening agent component in the range of about 0.1% to about 3% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773 issued to Todd et al. on Nov. 6, 2001, the disclosure of which is incorporated herein by reference. The surfactant or surfactants that may be used are included in the liquid hardening agent component in an amount in the range of about 1% to about 10% by weight of the liquid hardening agent component.

While not required, examples of hydrolyzable esters that may be used in the liquid hardening agent component include, but are not limited to, a mixture of dimethylglutarate, dimethyladipate, and dimethylsuccinate; dimethylthiolate; methyl salicylate; dimethyl salicylate; and dimethylsuccinate; and combinations thereof. When used, a hydrolyzable ester is included in the liquid hardening agent component in an amount in the range of about 0.1% to about 3% by weight of the liquid hardening agent component. In some embodiments a hydrolyzable ester is included in the liquid hardening agent component in an amount in the range of about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, and fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, and hexoxyethanol, and isomers thereof. Combinations of these may be suitable as well. Selection of an appropriate liquid carrier fluid is dependent on, inter alia, the resin composition chosen.

Other resins suitable for use in the present invention are furan-based resins. Suitable furan-based resins include, but are not limited to, furfuryl alcohol resins, furfural resins, mixtures furfuryl alcohol resins and aldehydes, and a mixture of furan resins and phenolic resins. Of these, furfuryl alcohol resins may be preferred. A furan-based resin may be combined with a solvent to control viscosity if desired. Suitable solvents for use in the furan-based consolidation fluids of the present invention include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred. In some embodiments, the furan-based resins suitable for use in the present invention may be capable of enduring temperatures well in excess of 350° F. without degrading. In some embodiments, the furan-based resins suitable for use in the present invention are capable of enduring temperatures up to about 700° F. without degrading.

Optionally, the furan-based resins suitable for use in the present invention may further comprise a curing agent, inter alia, to facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

Still other resins suitable for use in the methods of the present invention are phenolic-based resins. Suitable phenolic-based resins include, but are not limited to, terpolymers of phenol, phenolic formaldehyde resins, and a mixture of phenolic and furan resins. In some embodiments, a mixture of phenolic and furan resins may be preferred. A phenolic-based resin may be combined with a solvent to control viscosity if desired. Suitable solvents for use in the present invention include, but are not limited to butyl acetate, butyl lactate, furfuryl acetate, and 2-butoxy ethanol. Of these, 2-butoxy ethanol may be preferred in some embodiments.

Yet another resin-type material suitable for use in the methods of the present invention is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, an ethoxylated nonyl phenol phosphate ester, mixtures of one or more cationic surfactants, and one or more nonionic surfactants and an alkyl phosphonate surfactant.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, RL, and an upper limit, RU, is disclosed, any number falling within the range is specifically disclosed. In particular, the following numbers within the range are specifically disclosed: R=RL+k*(RU−RL), wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   identifying an interval of a subterranean formation to be treated, the interval comprising multiple portions, each portion having a different effective permeability;
   introducing a relative-permeability modifier into the interval at a differential pressure of no more than 90% of an anticipated fracture gradient of the interval;
      wherein the relative-permeability modifier modifies the interval to have a more uniform effective permeability to water-based fluids; and
      wherein the relative-permeability modifier comprises a water-soluble polymer; and
   introducing a sealant into the interval;
      wherein the more uniform effective permeability of the interval allows for a more uniform treatment of the interval by the sealant than would be allowed without treatment of the interval with the relative-permeability modifier.

2. The method of claim 1, wherein the interval comprises a first portion and a second portion;
   wherein, prior to contacting the interval with the relative-permeability modifier, the first portion has a first water permeability and the second portion has a second water permeability; and
   wherein, after contacting the interval with the relative-permeability modifier, the first portion and the second portion have about the same permeability.

3. The method of claim 1, wherein, after contacting the interval with the relative-permeability modifier, the effective permeability of the interval to water varies by up to about 40%.

4. The method of claim 1, wherein the water-soluble polymer comprises an amino group in quaternized form.

5. The method of claim 4, wherein the water-soluble polymer comprises a polymer that has been hydrophobically modified with an alkyl group having about 4 carbons to about 22 carbons present on the amino group in quaternized form.

6. The method of claim 4, wherein the amino group in quaternized form comprises a quaternized dialkyl amino pendant group.

7. The method of claim 4, wherein the amino group in quaternized form comprises a quaternized dimethyl amino pendant group.

8. The method of claim 4, wherein the water-soluble polymer comprises a polydimethylaminoethylmethacrylate or polydimethylaminopropylmethacrylamide, the amino group in quaternized form being hydrophobically modified with an alkyl group having about 4 carbons to about 22 carbons.

9. The method of claim 1, wherein the water-soluble polymer comprises an amino methacrylate/alkyl amino methacrylate copolymer.

10. The method of claim 1, wherein the water-soluble polymer comprises a hydrophobically modified polymer;
    wherein the hydrophobically modified polymer comprises a polymer backbone and a hydrophobic branch, the hydrophobic branch comprising an alkyl chain of about 4 to about 22 carbons.

11. The method of claim 1, wherein the water-soluble polymer comprises a hydrophobically modified polymer.

12. The method of claim 1, wherein the water-soluble polymer comprises a hydrophilically modified polymer.

13. The method of claim 1, wherein the sealant comprises a gelable aqueous silicate composition;
    wherein the gelable aqueous silicate composition comprises water, an alkali metal silicate solution, and a catalyst.

14. The method of claim 1, wherein the sealant comprises a crosslinkable aqueous polymer composition;
    wherein the crosslinkable aqueous polymer composition comprises water, a crosslinkable polymer, and a crosslinking agent.

15. The method of claim 1, wherein the sealant comprises a polymerizable organic monomer composition;
    wherein the polymerizable organic monomer composition comprises water, a water-soluble polymerizable organic monomer, an oxygen scavenger, and a primary initiator.

16. The method of claim 1, wherein the sealant comprises a resin.

17. The method of claim 1, further comprising:
    shutting in a wellbore penetrating the subterranean formation, after introducing the sealant into the interval.

18. The method of claim 1, wherein an elbow or a junction of a multi-lateral wellbore is present in the interval.

19. The method of claim 1, wherein an effective permeability of the interval after treatment with the relative-permeability modifier is at least about 1% to about 80% of its pre-treatment injectivity index.

20. The method of claim 1, further comprising:
    discontinuing introduction of the relative-permeability modifier to the interval if the differential pressure rises to 90% or more of the anticipated fracture gradient.

21. The method of claim 1, wherein the multiple portions of the interval are disposed sequentially along a wellbore penetrating the subterranean formation.

* * * * *